(12) United States Patent
Pollock et al.

(10) Patent No.: US 9,461,930 B2
(45) Date of Patent: Oct. 4, 2016

(54) MODIFYING DATA STREAMS WITHOUT REORDERING IN A MULTI-THREAD, MULTI-FLOW NETWORK PROCESSOR

(71) Applicant: Intel Corporation, Santa Clara, CA (US)

(72) Inventors: Steven J. Pollock, Allentown, PA (US); Deepak Mital, Orefield, PA (US); James T. Clee, Orefield, PA (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 13/687,958

(22) Filed: Nov. 28, 2012

(65) Prior Publication Data
US 2013/0089099 A1    Apr. 11, 2013

Related U.S. Application Data (63) Continuation-in-part of application No. 12/782,379, filed on May 18, 2010, and a continuation-in-part of application No. 12/782,393, filed on May 18, 2010, now Pat. No. 8,255,644, and a continuation-in-part of
(Continued)

(51) Int. Cl.
*G06F 7/00* (2006.01)
*G06F 15/00* (2006.01)
(Continued)

(52) U.S. Cl.
CPC ......... *H04L 47/6205* (2013.01); *G06F 15/167* (2013.01); *H04L 47/2441* (2013.01); *H04L 49/00* (2013.01); *H04L 49/101* (2013.01); *H04L 49/109* (2013.01); *H04L 49/506* (2013.01)

(58) Field of Classification Search
None
See application file for complete search history.

(56) References Cited

U.S. PATENT DOCUMENTS

| 665,802 A | 1/1901 | Baucom et al. |
| 4,123,795 A | 10/1978 | Dean, Jr. et al. |

(Continued)

FOREIGN PATENT DOCUMENTS

| EP | 141252 A2 | 4/2004 |
| GB | 2372172 A | 8/2002 |

(Continued)

OTHER PUBLICATIONS

Alan H. Karp and Rajiv Gupta, "Hardware Assist for Data Merging for Shared Memory Multiprocessors", Hewlett-Packard Labs, Palo Alto, CA, Mar. 13, 1994.
(Continued)

*Primary Examiner* — Corey S Faherty
(74) *Attorney, Agent, or Firm* — Nicholson De Vos Webster & Elliott LLP (57) ABSTRACT

Described embodiments classify packets received by a network processor. A processing module of the network processor generates tasks corresponding to each received packet. A scheduler generates contexts corresponding to tasks received by the packet classification processor from corresponding processing modules, each context corresponding to a given flow, and stores each context in a corresponding per-flow first-in, first-out buffer of the scheduler. A packet modifier generates a modified packet based on threads of instructions, each thread of instructions corresponding to a context received from the scheduler. The modified packet is generated before queuing the packet for transmission as an output packet of the network processor, and the packet modifier processes instructions for generating the modified packet in the order in which the contexts were generated for each flow, without head-of-line blocking between flows. The modified packets are queued for transmission as an output packet of the network processor.

20 Claims, 4 Drawing Sheets

Related U.S. Application Data application No. 12/782,411, filed on May 18, 2010, now Pat. No. 8,407,707.

(60) Provisional application No. 61/564,811, filed on Nov. 29, 2011.

(51) Int. Cl.

| | | |
|---|---|---|
| G06F 9/455 | (2006.01) | |
| G06F 9/46 | (2006.01) | |
| H04L 12/863 | (2013.01) | |
| H04L 12/933 | (2013.01) | |
| G06F 15/167 | (2006.01) | |
| H04L 12/931 | (2013.01) | |
| H04L 12/851 | (2013.01) | |

(56) References Cited

U.S. PATENT DOCUMENTS

| | | |
|---|---|---|
| 4,314,367 A | 2/1982 | Bakka et al. |
| 4,484,275 A * | 11/1984 | Katzman et al. ............... 710/40 |
| 4,622,631 A | 11/1986 | Frank et al. |
| 4,695,949 A | 9/1987 | Thatte et al. |
| 4,805,098 A | 2/1989 | Mills |
| 4,982,187 A | 1/1991 | Goldstein et al. |
| 5,394,534 A | 2/1995 | Kulakowski et al. |
| 5,396,490 A | 3/1995 | White et al. |
| 5,500,948 A | 3/1996 | Hinton et al. |
| 5,535,340 A | 7/1996 | Bell et al. |
| 5,623,698 A | 4/1997 | Stephenson et al. |
| 5,632,032 A | 5/1997 | Ault et al. |
| 5,689,506 A | 11/1997 | Chiussi et al. |
| 5,699,551 A | 12/1997 | Taylor et al. |
| 5,815,727 A | 9/1998 | Motomura |
| 5,825,878 A | 10/1998 | Takahashi et al. |
| 5,838,931 A | 11/1998 | Regenold et al. |
| 5,857,087 A | 1/1999 | Bemanian |
| 5,875,466 A | 2/1999 | Wakerly |
| 5,892,766 A | 4/1999 | Wicki et al. |
| 5,893,120 A | 4/1999 | Nemes |
| 5,909,695 A | 6/1999 | Wong et al. |
| 5,920,539 A | 7/1999 | Schell et al. |
| 5,920,900 A | 7/1999 | Poole et al. |
| 5,924,098 A | 7/1999 | Kluge |
| 5,943,283 A | 8/1999 | Wong et al. |
| 5,949,981 A | 9/1999 | Childers |
| 5,974,421 A | 10/1999 | Krishnaswamy et al. |
| 6,026,467 A | 2/2000 | Petty |
| 6,038,630 A | 3/2000 | Foster et al. |
| 6,052,697 A | 4/2000 | Bennett et al. |
| 6,105,118 A | 8/2000 | Maddalozzo, Jr. et al. |
| 6,115,802 A | 9/2000 | Tock et al. |
| 6,195,335 B1 | 2/2001 | Calvignac et al. |
| 6,216,167 B1 | 4/2001 | Momirov |
| 6,233,246 B1 | 5/2001 | Hareski et al. |
| 6,240,492 B1 | 5/2001 | Foster et al. |
| 6,247,105 B1 | 6/2001 | Goldstein et al. |
| 6,275,913 B1 | 8/2001 | Jeddeloh |
| 6,286,074 B1 | 9/2001 | Batchelor et al. |
| 6,289,013 B1 | 9/2001 | Lakshman et al. |
| 6,341,130 B1 | 1/2002 | Lakshman et al. |
| 6,381,668 B1 | 4/2002 | Lunteren |
| 6,442,655 B1 | 8/2002 | Eberhard et al. |
| 6,445,705 B1 | 9/2002 | Holden et al. |
| 6,456,510 B1 | 9/2002 | Patel et al. |
| 6,480,489 B1 | 11/2002 | Muller et al. |
| 6,487,643 B1 | 11/2002 | Khare |
| 6,507,928 B1 | 1/2003 | Richardson |
| 6,515,965 B1 | 2/2003 | Hou et al. |
| 6,553,030 B2 | 4/2003 | Ku et al. |
| 6,557,084 B2 | 4/2003 | Freerksen |
| 6,567,564 B1 | 5/2003 | van der Wal |
| 6,577,635 B2 | 6/2003 | Narayana et al. |
| 6,584,546 B2 | 6/2003 | Kavipurapu |
| 6,633,298 B2 | 10/2003 | Ashburn et al. |
| 6,636,932 B1 | 10/2003 | Regev et al. |
| 6,643,747 B2 | 11/2003 | Hammarlund |
| 6,658,012 B1 | 12/2003 | Baucom, Jr. et al. |
| 6,694,410 B1 | 2/2004 | Dang |
| 6,697,882 B1 | 2/2004 | Matsui |
| 6,704,794 B1 | 3/2004 | Kejriwal et al. |
| 6,725,337 B1 | 4/2004 | Tan et al. |
| 6,728,898 B2 | 4/2004 | Tremblay et al. |
| 6,772,298 B2 | 8/2004 | Khare et al. |
| 6,798,746 B1 | 9/2004 | Kloth et al. |
| 6,839,797 B2 | 1/2005 | Calle et al. |
| 6,839,830 B2 | 1/2005 | Liu |
| 6,842,792 B2 | 1/2005 | Johnson et al. |
| 6,868,459 B1 | 3/2005 | Stuber |
| 6,874,052 B1 | 3/2005 | Delmonico |
| 6,888,841 B1 | 5/2005 | Ozaki |
| 6,907,469 B1 | 6/2005 | Gallo et al. |
| 6,914,746 B1 | 7/2005 | Meyer |
| 6,914,882 B2 | 7/2005 | Merani et al. |
| 6,938,138 B2 | 8/2005 | Beukema et al. |
| 6,977,930 B1 | 12/2005 | Epps et al. |
| 6,981,105 B2 | 12/2005 | Bourne et al. |
| 6,999,413 B2 | 2/2006 | Moriwaki et al. |
| 7,027,443 B2 | 4/2006 | Nichols et al. |
| 7,031,985 B1 | 4/2006 | Pecheny |
| 7,058,057 B2 | 6/2006 | Dooley et al. |
| 7,085,911 B2 | 8/2006 | Sachedina et al. |
| 7,089,346 B2 | 8/2006 | Cebulla et al. |
| 7,096,370 B1 | 8/2006 | Klein |
| 7,103,045 B2 | 9/2006 | Lavigne et al. |
| 7,110,415 B1 | 9/2006 | Walsh et al. |
| 7,159,219 B2 | 1/2007 | Chen et al. |
| 7,161,754 B2 | 1/2007 | Hanazawa et al. |
| 7,181,556 B2 | 2/2007 | Gwilt |
| 7,200,837 B2 | 4/2007 | Stevens |
| 7,212,534 B2 | 5/2007 | Kadambi et al. |
| 7,234,018 B1 | 6/2007 | Purcell et al. |
| 7,248,585 B2 | 7/2007 | Kohn et al. |
| 7,251,757 B2 | 7/2007 | Ouellette et al. |
| 7,272,705 B2 | 9/2007 | Revilla et al. |
| 7,287,046 B2 | 10/2007 | Bulka et al. |
| 7,287,255 B2 | 10/2007 | Potter, Jr. |
| 7,289,964 B1 | 10/2007 | Bowman-Amuah |
| 7,293,142 B1 | 11/2007 | Xu et al. |
| 7,298,746 B1 | 11/2007 | De La Iglesia et al. |
| 7,302,542 B1 | 11/2007 | Cantrill |
| 7,308,526 B2 | 12/2007 | Lakshmanamurthy et al. |
| 7,321,965 B2 | 1/2008 | Kissell |
| 7,334,178 B1 | 2/2008 | Aulagnier |
| 7,353,349 B2 | 4/2008 | Sadowsky et al. |
| 7,356,622 B2 | 4/2008 | Hattrup et al. |
| 7,394,822 B2 | 7/2008 | Mathews et al. |
| 7,397,809 B2 | 7/2008 | Wang |
| 7,415,540 B2 | 8/2008 | Fallon et al. |
| 7,453,898 B1 | 11/2008 | Cohen et al. |
| 7,461,187 B2 | 12/2008 | Morishita |
| 7,461,208 B1 | 12/2008 | Caprioli et al. |
| 7,461,407 B2 | 12/2008 | Little et al. |
| 7,475,182 B2 | 1/2009 | Matsuse |
| 7,487,321 B2 | 2/2009 | Muthiah et al. |
| 7,489,635 B2 | 2/2009 | Evans et al. |
| 7,490,111 B2 | 2/2009 | Shen et al. |
| 7,512,740 B2 | 3/2009 | Diefendorff |
| 7,519,065 B2 | 4/2009 | Angle et al. |
| 7,525,962 B2 | 4/2009 | Kounavis et al. |
| 7,549,024 B2 | 6/2009 | Piry et al. |
| 7,551,617 B2 | 6/2009 | Eatherton et al. |
| 7,552,057 B2 | 6/2009 | McGwin, Jr. |
| 7,554,464 B1 | 6/2009 | Oberdorfer |
| 7,554,928 B2 | 6/2009 | Bhargava et al. |
| 7,567,508 B2 | 7/2009 | Charny et al. |
| 7,571,284 B1 | 8/2009 | Olson et al. |
| 7,577,792 B2 | 8/2009 | Hady et al. |
| 7,594,028 B1 | 9/2009 | Jacobs et al. |
| 7,596,142 B1 | 9/2009 | MacAdam |
| 7,600,078 B1 | 10/2009 | Cen et al. |
| 7,610,473 B2 | 10/2009 | Kissell |
| 7,613,882 B1 | 11/2009 | Akkawi et al. |
| 7,623,543 B2 | 11/2009 | Su et al. |

(56) References Cited

U.S. PATENT DOCUMENTS

| | | |
|---|---|---|
| 7,650,453 B2 | 1/2010 | Torii |
| 7,659,894 B2 | 2/2010 | Keller et al. |
| 7,660,259 B1 | 2/2010 | Grosser et al. |
| 7,660,953 B2 | 2/2010 | Ohran |
| 7,664,907 B1 | 2/2010 | Hutsell et al. |
| 7,676,613 B2 | 3/2010 | Bashford |
| 7,680,966 B1 | 3/2010 | Falik et al. |
| 7,689,867 B2 | 3/2010 | Rosenbluth et al. |
| 7,694,152 B2 | 4/2010 | Carr |
| 7,707,367 B1 | 4/2010 | Tran et al. |
| 7,710,988 B1 | 5/2010 | Tripathi et al. |
| 7,720,055 B2 | 5/2010 | Kadambi et al. |
| 7,738,454 B1 | 6/2010 | Panwar et al. |
| 7,778,815 B2 | 8/2010 | Pasricha |
| 7,779,273 B2 | 8/2010 | Dale et al. |
| 7,809,701 B2 | 10/2010 | Blake |
| 7,822,906 B2 | 10/2010 | Fan |
| 7,826,434 B2 | 11/2010 | Goldrian et al. |
| 7,849,315 B2 | 12/2010 | Hardy et al. |
| 7,860,006 B1 | 12/2010 | Kashyap et al. |
| 7,886,150 B2 | 2/2011 | Stollon et al. |
| 7,917,676 B2 | 3/2011 | Sullivan |
| 7,934,046 B2 | 4/2011 | Butter et al. |
| 7,936,687 B1 | 5/2011 | Parker et al. |
| 7,949,732 B1 | 5/2011 | Roesch et al. |
| 7,991,928 B2 | 8/2011 | Keller |
| 8,006,021 B1 | 8/2011 | Li |
| 8,014,295 B2 | 9/2011 | Chang et al. |
| 8,041,867 B2 | 10/2011 | Lin |
| 8,065,449 B2 | 11/2011 | Shimokawa |
| 8,065,678 B2 | 11/2011 | Sydir et al. |
| 8,074,047 B2 | 12/2011 | Abali et al. |
| 8,127,350 B2 | 2/2012 | Wei et al. |
| 8,135,926 B1 | 3/2012 | Glasco et al. |
| 8,140,759 B2 | 3/2012 | Frey et al. |
| 8,171,186 B1 | 5/2012 | Karguth |
| 8,255,644 B2 | 8/2012 | Sonnier et al. |
| 8,271,805 B2 | 9/2012 | Yasue |
| 8,295,891 B2 | 10/2012 | Castor et al. |
| 8,321,385 B2 | 11/2012 | Burroughs et al. |
| 8,370,806 B2 | 2/2013 | Codrescu et al. |
| 8,473,657 B2 | 6/2013 | Zhou et al. |
| 2002/0012327 A1 | 1/2002 | Okada |
| 2002/0029214 A1 | 3/2002 | Yianilos et al. |
| 2002/0034182 A1 | 3/2002 | Mallory |
| 2002/0067296 A1 | 6/2002 | Brown |
| 2002/0078040 A1 | 6/2002 | Hawkinson |
| 2002/0085545 A1 | 7/2002 | Ku et al. |
| 2002/0099913 A1 | 7/2002 | Steely |
| 2002/0118683 A1 | 8/2002 | Narayana et al. |
| 2002/0122671 A1 | 9/2002 | Yoshimura |
| 2002/0144065 A1* | 10/2002 | Mills et al. ............ 711/147 |
| 2002/0165985 A1 | 11/2002 | Chen et al. |
| 2002/0184643 A1 | 12/2002 | Fichet |
| 2002/0199062 A1 | 12/2002 | Bormann |
| 2003/0033026 A1 | 2/2003 | Murphy |
| 2003/0033276 A1 | 2/2003 | Cheng et al. |
| 2003/0037154 A1 | 2/2003 | Poggio et al. |
| 2003/0041163 A1 | 2/2003 | Rhoades et al. |
| 2003/0061457 A1 | 3/2003 | Geiger et al. |
| 2003/0088626 A1* | 5/2003 | Gupta et al. ............ 709/206 |
| 2003/0115417 A1 | 6/2003 | Corrigan |
| 2003/0118023 A1 | 6/2003 | Brown et al. |
| 2003/0123468 A1 | 7/2003 | Nong |
| 2003/0174701 A1 | 9/2003 | Angle et al. |
| 2003/0191857 A1 | 10/2003 | Terrell et al. |
| 2003/0200451 A1 | 10/2003 | Evans et al. |
| 2004/0004968 A1 | 1/2004 | Nassar |
| 2004/0057380 A1 | 3/2004 | Biran et al. |
| 2004/0068616 A1 | 4/2004 | Tierney et al. |
| 2004/0073617 A1 | 4/2004 | Milliken et al. |
| 2004/0073623 A1 | 4/2004 | Benkual et al. |
| 2004/0255209 A1 | 12/2004 | Gross |
| 2005/0010728 A1 | 1/2005 | Piry et al. |
| 2005/0021871 A1 | 1/2005 | Georgiou et al. |
| 2005/0021874 A1 | 1/2005 | Georgiou et al. |
| 2005/0027920 A1 | 2/2005 | Fitzsimmons et al. |
| 2005/0044323 A1 | 2/2005 | Hass |
| 2005/0141537 A1 | 6/2005 | Kumar et al. |
| 2005/0152352 A1 | 7/2005 | Jun et al. |
| 2005/0160132 A1 | 7/2005 | Van Doren et al. |
| 2005/0201415 A1 | 9/2005 | Narsinh et al. |
| 2005/0216666 A1 | 9/2005 | Sih et al. |
| 2005/0223107 A1 | 10/2005 | Mine et al. |
| 2005/0240820 A1 | 10/2005 | Vannerson et al. |
| 2005/0243853 A1 | 11/2005 | Bitar et al. |
| 2005/0276230 A1 | 12/2005 | Akahane et al. |
| 2006/0029079 A1 | 2/2006 | Cohen et al. |
| 2006/0085554 A1 | 4/2006 | Shah et al. |
| 2006/0095910 A1 | 5/2006 | Norton et al. |
| 2006/0104281 A1 | 5/2006 | Scarr et al. |
| 2006/0126628 A1 | 6/2006 | Li et al. |
| 2006/0153184 A1 | 7/2006 | Kounavis et al. |
| 2006/0155820 A1* | 7/2006 | Umlauf et al. ............ 709/213 |
| 2006/0165111 A1 | 7/2006 | Varma |
| 2006/0256783 A1 | 11/2006 | Ayrapetian et al. |
| 2006/0259572 A1 | 11/2006 | Brown |
| 2006/0294126 A1 | 12/2006 | Ganjoo |
| 2007/0005852 A1 | 1/2007 | Armstead et al. |
| 2007/0006233 A1 | 1/2007 | Finger et al. |
| 2007/0011396 A1 | 1/2007 | Singh et al. |
| 2007/0016756 A1 | 1/2007 | Hsieh et al. |
| 2007/0016835 A1 | 1/2007 | Hronik et al. |
| 2007/0038798 A1 | 2/2007 | Bouchard et al. |
| 2007/0043856 A1 | 2/2007 | Morris et al. |
| 2007/0083870 A1 | 4/2007 | Kanakogi |
| 2007/0106990 A1 | 5/2007 | Kissell |
| 2007/0156725 A1 | 7/2007 | Ehret et al. |
| 2007/0189283 A1 | 8/2007 | Agarwal et al. |
| 2007/0226798 A1 | 9/2007 | Sibert |
| 2007/0271374 A1 | 11/2007 | Shomura et al. |
| 2007/0294702 A1 | 12/2007 | Melvin et al. |
| 2008/0021908 A1 | 1/2008 | Trask et al. |
| 2008/0037429 A1 | 2/2008 | Lansing et al. |
| 2008/0046657 A1 | 2/2008 | Eichenberger et al. |
| 2008/0077926 A1 | 3/2008 | Jeter et al. |
| 2008/0077928 A1 | 3/2008 | Matsuzaki et al. |
| 2008/0092092 A1 | 4/2008 | Dalton et al. |
| 2008/0155002 A1 | 6/2008 | Janczak et al. |
| 2008/0162605 A1 | 7/2008 | Tsuchiya |
| 2008/0162793 A1 | 7/2008 | Chu et al. |
| 2008/0239992 A1 | 10/2008 | Krasnyanskiy |
| 2008/0240103 A1 | 10/2008 | Schmidt |
| 2008/0240106 A1 | 10/2008 | Schlenk |
| 2009/0006718 A1 | 1/2009 | Blumrich et al. |
| 2009/0019270 A1 | 1/2009 | Halter et al. |
| 2009/0100055 A1 | 4/2009 | Wang |
| 2009/0132827 A1 | 5/2009 | Little et al. |
| 2009/0177830 A1 | 7/2009 | Orion et al. |
| 2009/0216915 A1 | 8/2009 | Dunn et al. |
| 2009/0249318 A1 | 10/2009 | Ayguade et al. |
| 2009/0271562 A1 | 10/2009 | Sinclair |
| 2010/0027436 A1 | 2/2010 | Yamasaki |
| 2010/0074135 A1 | 3/2010 | Pepper |
| 2010/0100682 A1 | 4/2010 | Guthrie et al. |
| 2010/0110745 A1 | 5/2010 | Jeddeloh et al. |
| 2010/0157931 A1 | 6/2010 | Vanderaar et al. |
| 2010/0238938 A1 | 9/2010 | Zhou et al. |
| 2010/0241813 A1 | 9/2010 | Shen |
| 2010/0246584 A1 | 9/2010 | Ferguson et al. |
| 2010/0257181 A1 | 10/2010 | Zhou et al. |
| 2010/0260198 A1 | 10/2010 | Rojas-Cessa et al. |
| 2010/0278195 A1 | 11/2010 | Wagh et al. |
| 2010/0293312 A1 | 11/2010 | Sonnier et al. |
| 2010/0293353 A1 | 11/2010 | Sonnier et al. |
| 2010/0316062 A1 | 12/2010 | Manzella |
| 2010/0332698 A1 | 12/2010 | Muller |
| 2011/0035555 A1 | 2/2011 | Wang et al. |
| 2011/0055439 A1 | 3/2011 | Chen et al. |
| 2011/0145501 A1 | 6/2011 | Steely, Jr. et al. |
| 2011/0179200 A1 | 7/2011 | Sukonik et al. |
| 2011/0219195 A1 | 9/2011 | Habusha et al. |
| 2011/0225334 A1 | 9/2011 | Byrne et al. |
| 2011/0225337 A1 | 9/2011 | Byrne et al. |

(56) References Cited

U.S. PATENT DOCUMENTS

| | | |
|---|---|---|
| 2011/0225376 A1 | 9/2011 | Hasting et al. |
| 2011/0280244 A1 | 11/2011 | Gopinath et al. |
| 2011/0307659 A1 | 12/2011 | Hans et al. |
| 2012/0005391 A1 | 1/2012 | Byrne et al. |
| 2012/0020250 A1 | 1/2012 | Sundararaman et al. |
| 2012/0020368 A1 | 1/2012 | Sundararaman et al. |
| 2012/0020370 A1 | 1/2012 | Sonnier et al. |
| 2012/0023295 A1 | 1/2012 | Nemawarkar |
| 2012/0023498 A1 | 1/2012 | Sundararaman et al. |
| 2012/0036134 A1 | 2/2012 | Malakhov |
| 2012/0159494 A1 | 6/2012 | Shafiee et al. |
| 2012/0300772 A1 | 11/2012 | Manzella et al. |
| 2013/0031239 A1 | 1/2013 | Umanesan |

FOREIGN PATENT DOCUMENTS

| | | |
|---|---|---|
| JP | H02-271444 | 11/1990 |
| WO | 2004/045167 A1 | 5/2004 |

OTHER PUBLICATIONS

Sundaram, Chandra, Goyal, Shenoy, Sahni, Vin. "Application Performance in the QLinux Multimedia Operating System", ACM Multimedia, Los Angeles, CA (2000).

Lu, Sheng, Dinda. "Size-based Scheduling Policies with Inaccurate Scheduling Information", Proceedings of the IEEE Computer Society's 12th Annual International Symposium on Modeling, Analysis, and Simulation of Computer and Telecommunications Systems (2004).

Schurgers, Raghunathan, Srivastava. "Modulation Scaling for Real-time Energy Aware Packet Scheduling", IEEE, Nov. 2001.

Chiueh et al., "High-Performance IP Routing Table Lookup Using CPU Caching", IEEE (1999).

Minkenberg, Cyriel, "Integrating Unicast and Multicast Traffic Scheduling in a Combined Input- and Output-Queued Packet-Switching System," Proceedings of the Ninth International Conference on Computer Communications and Networks. Oct. 16-18, 2000, pp. 127-134, IEEE (USA2000).

Rojas-Cessa, et al. "CIXOB-k: Combined Input-Crosspoint-Output Buffered Packet Switch", IEEE Global Telecommunications Conference 2001 vol. 4, Issue 2001, pp. 2654-2660, Nov. 2001.

Rojas-Cessa, et al. "CIXB-1: Combined Input-One-cell-Crosspoint Buffered Switch", IEEE Workshop on High Performance Switching and Routing 2001, pp. 324-329, May 2001.

Rojas-Cessa, et al. "On the Maximum Throughput of a Combined Input-Crosspoint Buffered Packet Switch", IEICE Transactions on Communications, vol. E89-B, No. 11, pp. 3120-3123, Nov.

Guo, et al. "Framed Round-Robin Arbitration with Explicit Feedback Control for Combined Input-Crosspoint Buffered Packet Switches", IEEE International Conference on Communications 2006, Jun. 11-15, 2006, pp. 97-102.

Guo, et al. "Combining Distributed and Centralized Arbitration Schemes for Combined Input-Crosspoint Buffered Packet Switches" IEEE International Conference on Networks, Nov. 2005.

Braden et al; RFC 2309: Recommendations on Queue Management and Congestion Avoidance in the Internet; pp. 17, Apr. 1998, USA.

Ruay-Shiung Chang et al; A Dynamic Weighted Data Replication Strategy in Data Grids; pp. 414-421, 2008; IEEE; USA.

Pan, Deng et al. "FIFO-based Multicast Scheduling Algorithm for Virtual Output Queued Packet Switches," IEEE Transactions on Computers, vol. 54, No. 10, pp. 1283-1297, Oct. 2005 (USA).

Arm Limited, AMBA AXI Protocol, v1.0. Specification. pp. 108, Mar. 19, 2004 (UK).

IBM. 128-bit Processor Local Bus. Architecture Specifications. Version 4.7. 175 pp. 108, May 2, 2007 (US).

\* cited by examiner

MODIFYING DATA STREAMS WITHOUT REORDERING IN A MULTI-THREAD, MULTI-FLOW NETWORK PROCESSOR

CROSS-REFERENCE TO RELATED APPLICATIONS

This application claims the benefit of the filing date of U.S. provisional application No. 61/564,811 filed Nov. 29, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, now issued as U.S. Pat. No. 8,255,644, and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, Ser. No. 12/729,231 filed Mar. 22, 2010, now issued as U.S. Pat. No. 8,473,657, Ser. No. 12/963,895 filed Dec. 9, 2010, now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28, 2010 now issued as U.S. Pat. No. 8,489,794, Ser. No. 13/046,717 filed Mar. 12, 2011, Ser. No. 13/046,719 filed Mar. 12, 2011, now issued as U.S. Pat. No. 8,321,385, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, Ser. No. 13/568,365 filed Aug. 7, 2012, Ser. No. 13/687,719 filed Nov. 28, 2012, Ser. No. 13/687,772 filed Nov. 28, 2012, Ser. No. 13/687,865 filed Nov. 28, 2012, Ser. No. 13/687,911 filed Nov. 2, 2012, and Ser. No. 13/687,971 filed Nov. 28, 2012, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

Network processors typically employ a classification stage where each received data packet is examined to identify information about the packet, such as a source address, destination address(es) and a packet type to determine processing requirements of the packet. Based on the classification results, received packets are typically placed output queues to be scheduled for processing and transmission by the network processor based on scheduling, traffic management, or traffic shaping requirements of the network processor or destination devices in communication with the network processor.

Modification to the packet data might typically be performed subsequent to queuing It might be desirable to modify the packet data prior to the packet being placed into an output queue. Typically, packet classification and modification might be required to run simultaneously, which could slow both operations. Additionally, typical packet modifiers might be required to read and write the entire packet data. Further, if the network processor maintains packet ordering on a global basis, head of line blocking could occur where subsequent packets could not be processed until all prior (even unrelated) packets had completed processing in their entirety.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide classify packets received by a network processor. A processing module of the network processor generates tasks corresponding to each received packet. A scheduler generates contexts corresponding to tasks received by the packet classification processor from corresponding processing modules, each context corresponding to a given flow, and stores each context in a corresponding per-flow first-in, first-out buffer of the scheduler. A packet modifier generates a modified packet based on threads of instructions, each thread of instructions corresponding to a context received from the scheduler. The modified packet is generated before queuing the packet for transmission as an output packet of the network processor, and the packet modifier processes instructions for generating the modified packet in the order in which the contexts were generated for each flow, without head-of-line blocking between flows. The modified packets are queued for transmission as an output packet of the network processor.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

Described embodiments classify packets received by a network processor. A processing module of the network processor generates tasks corresponding to each received packet. A scheduler generates contexts corresponding to tasks received by the packet classification processor from corresponding processing modules, each context corresponding to a given flow, and stores each context in a corresponding per-flow first-in, first-out buffer of the scheduler. A packet modifier generates a modified packet based on threads of instructions, each thread of instructions corresponding to a context received from the scheduler. The modified packet is generated before queuing the packet for transmission as an output packet of the network processor, and the packet modifier processes instructions for generating the modified packet in the order in which the contexts were generated for each flow, without head-of-line blocking between flows. The modified packets are queued for transmission as an output packet of the network processor.

Table 1 defines a list of acronyms employed throughout this specification as an aid to understanding the described embodiments:

TABLE 1

| AMBA | Advanced Microcontroller Bus Architecture | AXI | Advanced eXtensible Interface |
|---|---|---|---|
| CAM | Content Addressable Memory | CCL | Classification Completion List |
| CPU | Central Processing Unit | CRC | Cyclic Redundancy Check |
| DDR | Double Data Rate | DMA | Direct Memory Access |
| DRAM | Dynamic Random Access Memory | ECC | Error Correction Code |
| eDRAM | Embedded DRAM | FC | Fibre Channel |
| FIFO | First-In, First-Out | flow ID | Flow IDentifier |
| FSM | Finite State Machine | I/O | Input/Output |
| IP | Internet Protocol | LRU | Least Recently Used |
| LSB | Least Significant Bit | μP | Microprocessor |
| MMB | Memory Manager Block | MPP | Modular Packet Processor |
| MTM | Modular Traffic Manager | OUL | Oldest Unspecified List |
| OQ | Output Queue | PAB | Packet Assembly Block |
| PCI-E | Peripheral Component Interconnect Express | PDU | Protocol Data Unit |
| PLB | Processor Local Bus | PIC | Packet Integrity Checker |
| PQM | Per-Queue Modifier | RF | Radio Frequency |
| SAS | Serial Attached SCSI | SATA | Serial Advanced Technology Attachment |
| SCH | Scheduler | SCSI | Small Computer System Interface |
| SED | Stream Editor | SoC | System-on-Chip |
| SPP | Security Protocol Processor | SRIO | Serial Rapid I/O |
| TCP | Transmission Control Protocol | THID | THread IDentifier |
| TS | Thread Start | TID | Task IDentifier |
| USB | Universal Serial Bus | | |

Figure 1:
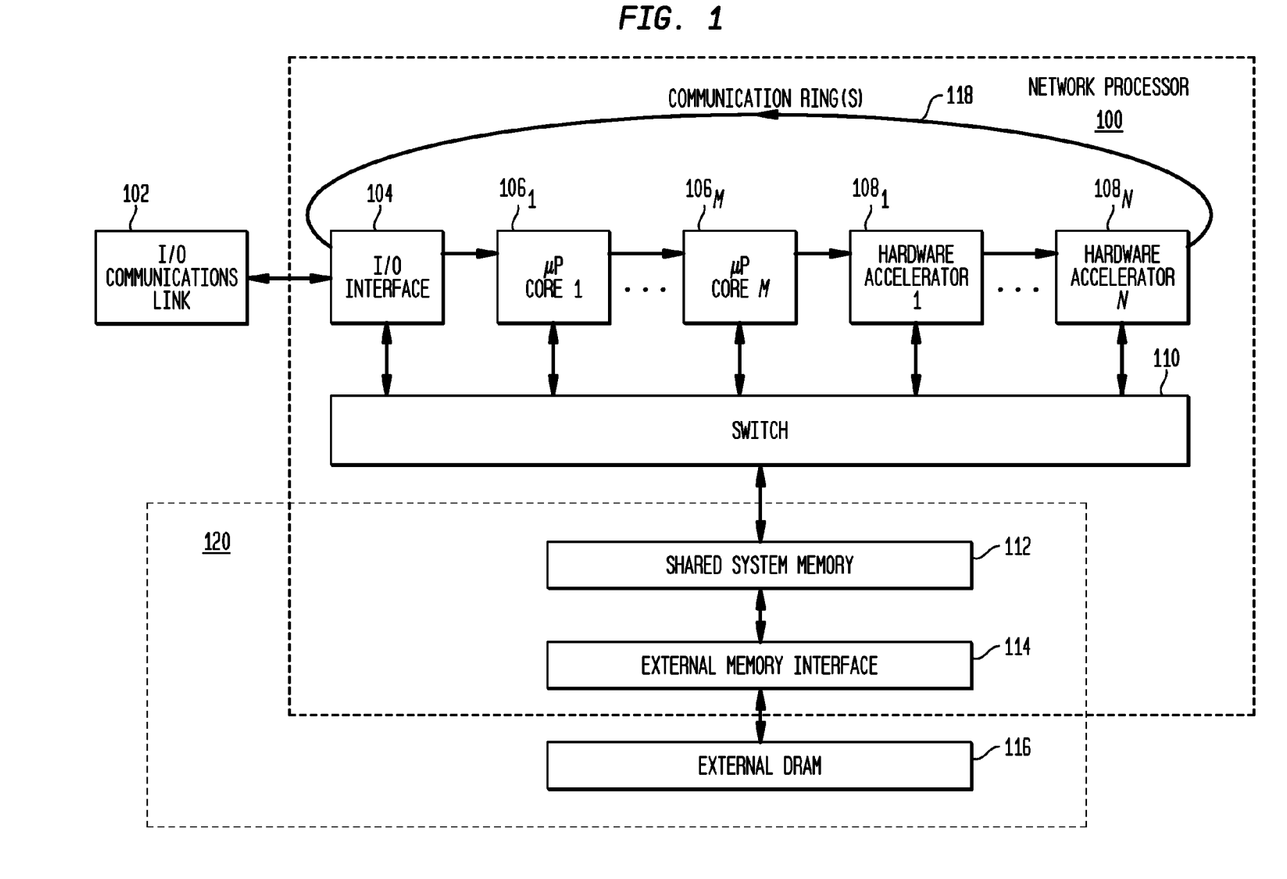
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. Shared memory 112 might be implemented as embedded dynamic random-access memory (eDRAM) internal to network processor 100. External memory 116 might typically be implemented as a double-data-rate (e.g., DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In described embodiments, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not currently in use by the various μP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In described embodiments, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No. 13/405,053 filed Feb. 23, 2012, the teachings of which are incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010 and Ser. No. 13/474,114 filed May 17, 2012, the teachings of which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, the teachings of which are incorporated by reference herein.

Figure 2:
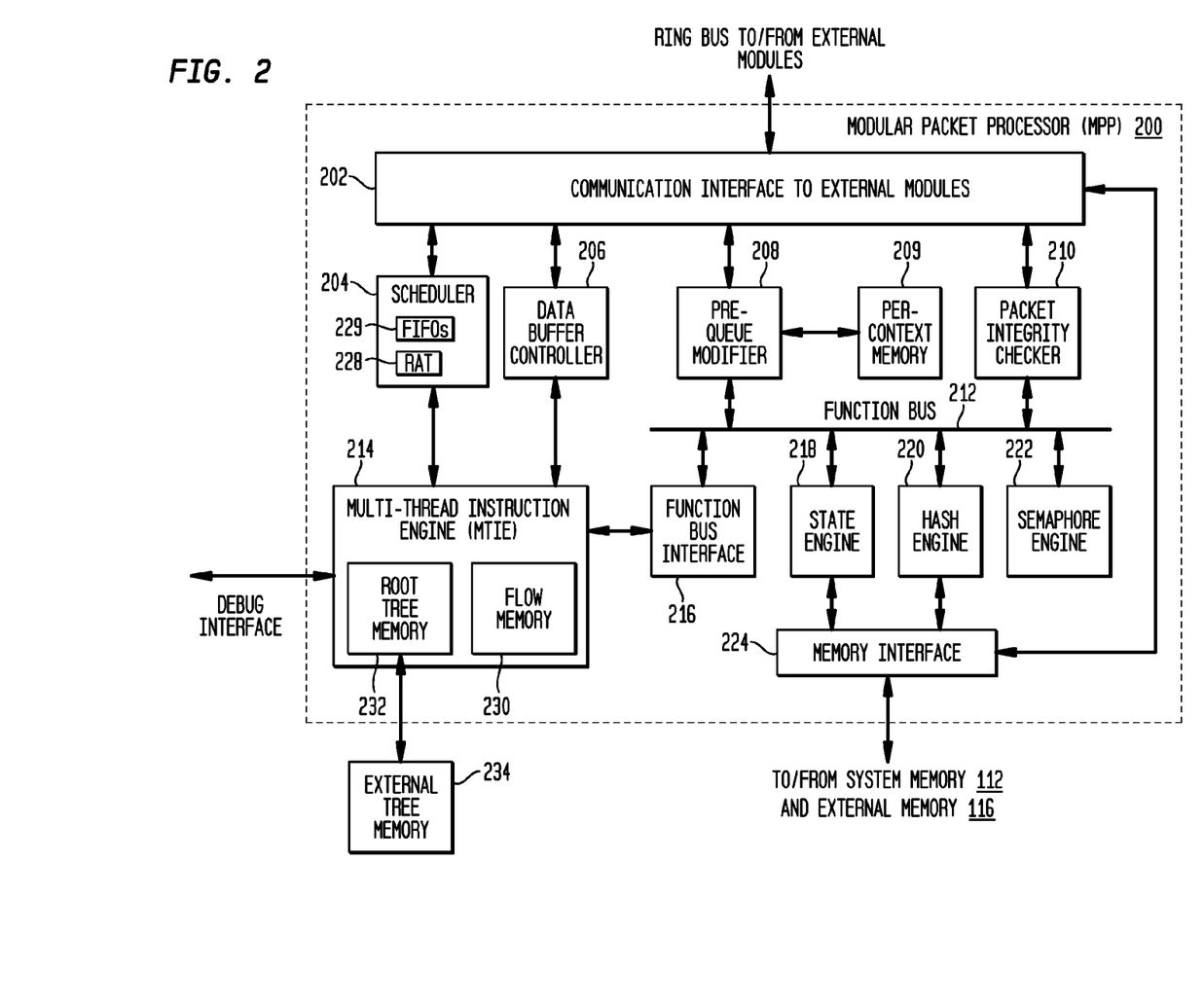
FIG. 2 shows a block diagram of a modular packet processor submodule of the network processor of FIG. 1 in accordance with exemplary embodiments.

FIG. 2 shows a block diagram of an exemplary MPP 200, in accordance with described embodiments. MPP 200 might receive an input task from any μP core or accelerator (e.g., μP cores 106 or accelerators 108) of network processor 100. MPP 200 performs operations specified by the input task on a data packet stored in at least one of shared memory 112 and external memory 116. When MPP 200 is finished operating on the data packet, MPP 200 might generate an output task to another μP core or accelerator of network processor 100, for example, a next μP core or accelerator specified for a given virtual flow identifier.

As described herein, MPP 200 might generally be employed as a packet classification engine in network processor 100. In general, packet classification categorizes packets into classes, for example, based on port number or protocol. Each resulting packet class might be treated differently to control packet flow, for example, each packet class might be subject to a different rate limit or prioritized differently relative to other packet classes. Classification is achieved by various means. Matching bit patterns of data to those of known protocols is a simple, yet widely-used technique. More advanced traffic classification techniques rely on statistical analysis of attributes such as byte frequencies, packet sizes and packet inter-arrival times. Upon classifying a traffic flow using a particular protocol, a predetermined policy can be applied to it and other flows to either guarantee a certain quality (as with VoIP or media streaming service) or to provide best-effort delivery.

As shown in FIG. 2, and as will be described, packet classification might be performed by Multi-thread Instruction Engine (MTIE) 214 of MPP 200. Packet (also Protocol Data Unit or PDU) data modification might be carried out by Pre-Queue Modifier (PQM) 208. A packet integrity check might typically be carried out by Packet Integrity Checker (PIC) 210, such as determining that a packet is properly formed according to a given protocol. PIC 210 might, for example, implement various CRC and checksum functions of MPP 200. Interface to communication interface 202 might provide a standard interface between MPP 200 and chip level connections to external modules of network processor 100, for example by one or more ring communication buses. Semaphore Engine (SEM) 222 implements semaphore logic in MPP 200, to manage atomic access to a hardware resource of network processor 100 and MPP 200. For example, for a context thread to utilize an instance of a hardware resource, the context thread might have to reserve a semaphore for that resource. Hash table operations might be carried out by Hash Engine (HE) 220. HE 220 implements hash engine functionality in MPP 200. HE 220 receives instructions from Function Bus Interface (FBI) 216 over function bus 212. State Engine (SENG) 218 might perform functions of a finite state machine (FSM) that operates on received packets. For example, SENG 218 might perform statistics counts and run traffic shaper scripts.

MPP 200 might generally be implemented as a multi-threaded engine capable of executing parallel functions. The multi-threading operation is performed by multiple contexts in MTIE 214. Some embodiments of MPP 200 might employ more than one MTIE 214 to support additional context processing. For example, MPP 200 might preferably include 4 MTIE cores, each capable of processing 32 contexts, for a total of 128 contexts. These contexts might be supported by 256 task identifiers (TIDs), meaning that contexts for up to 256 tasks might be concurrently active in MPP 200.

MPP 200 might typically receive input tasks via a task ring such as described in U.S. patent application Ser. No. 12/782,379 filed May 18, 2010. Additionally, MPP 200 might receive a timer event via a timer ring. Receiving a task or receiving a timer event results in a context being generated in MPP 200 corresponding to the received task or timer event. Upon receiving a task, MPP 200 reads the task from system memory 112, for example via communication interface 202 and memory interface 224. Communication interface 202 issues a task start request to MTIE core 214 via scheduler (SCH) 204. A typical task might include 32 bytes of parameter data, and a typical timer event might include 13 bytes of parameter data.

SCH 204 tracks MPP contexts, maintains a list of free contexts, and schedules contexts for execution by the MTIE cores. SCH 204 might operate substantially as described in related U.S. patent application Ser. Nos. 12/975,823, 12/975,880, 12/976,045, 13/046,726, 12/974,477 and 12/976,228, included by reference herein. For example, upon receiving a task start request, if a free context is available, SCH 204 issues a context start indication to one or more other modules of MPP 200 such that the various modules, if necessary, might initialize themselves to process the context. Upon receiving the context start indication from SCH 204, MTIE 214 initializes its internal context memory and loads the task parameters of the received task. Upon receiving the context start indication from SCH 204, Data Buffer Controller 206 initiates a data read operation to read the packet data corresponding to the context from at least one of system memory 112 and external memory 116.

After the context start indication is issued, SCH 204 issues a context schedule indication to MTIE 214. In response to the context schedule indication, MTIE 214 starts executing a first command stored at the location specified in root address table (RAT) 228. The command might be stored in at least one of root tree memory 232, flow memory 230, and external tree memory 234. While executing the specified commands, MTIE 214 fetches tree instructions from either root tree memory 232 or external tree memory 234. MTIE 214 also fetches flow instructions from flow memory 230. Some embodiments might include a 16 KB flow memory for each MTIE core of MPP 200, and some embodiments might further allow the flow memory for multiple MTIE cores to be shared to increase the size of the flow memory for all MTIE cores.

Upon reaching a point in context processing that requires processing by a module of MPP 200 external to MTIE 214, MTIE 214 sends the context along with the corresponding function call and arguments to FBI 216. Once the context is delivered to FBI 216, the context might become inactive in MTIE 214 as, in general, a given context might only be active in one module of MPP 200 at any one time. FBI 216 provides the function call to the designated unit for execution via function bus 212. Although function bus 212 is shown in FIG. 2 as a single bus, some embodiments might employ more than one function bus 212, based on the type of module that is coupled to each bus. In general, function bus 212 might be employed to communicate between MTIE 214 and HE 220, PIC 210, SEM 222, PQM 208 and SENG 218.

Data Buffer Controller (DBC) 206 might implement the data buffer function. DBC 206 fetches PDU data for MTIE 214 from memory external to MPP 200 (e.g., one of system memory 112 or external memory 116). DBC 206 might issue a read indication signal and a read done indication signal to FBI 216 to schedule the read requests. DBC 206 might have up to 2 read requests pending at any time for a given context. FBI 216 might prevent context termination if DBC 206 has pending reads for the context.

MPP 200 might employ a flow identifier (flowID) of packets to maintain function ordering and packet scheduling. As described herein, MPP 200 might employ the flowID to determine the output packet order of network processor 100 and to order function calls and tasks within various submodules of MPP 200. As described in related U.S. patent application Ser. Nos. 12/974,477 filed on Dec. 21, 2010 and Ser. No. 13/687,719 filed on common date herewith, embodiments might typically employ an Oldest Unspecified List (OUL) to perform ordering.

MPP 200 might track a virtual flow identifier (vflow ID) and an index (vflow Index) with each output task, indicative of what one(s) of cores 106 or accelerators 108 operate on a data packet after MPP 200 has finished its processing. Communication interface 202 generates an output task based on the vflow ID and vflow Index and the output task is transmitted, for example via a task ring, to the subsequent destination module. An input task might result in the generation of multiple output tasks. As described herein, MPP 200 maintains task order between input and output, such that output tasks are generated in the order in which the input tasks are received by MPP 200, and thus also the order in which the corresponding contexts are started in MPP 200.

SCH 204 starts a new context when new tasks are received by MPP 200. SCH 204 receives a Task ID (TID) that identifies the received task and starts a context by allocating a context number to associate with that task. The TID and context number might be passed on to other modules of MPP 200 when the context is started. A context is associated with this TID and context number until SCH 204 receives an indication that processing of the context is terminated. In general, a new context is started for a received task if the following conditions are true: (1) there are available contexts; and (2) a Task Start FIFO buffer has enough available entries for at least one complete task.

Described embodiments of PQM 208 perform operations on a user-scalable number of instruction flows in parallel to reduce head-of-line blocking cases. Ordering is maintained by employing a per-context RAM and set of per-flow FIFO buffers. In described embodiments, PQM 208 maintains a list of packet modification instructions generated during packet classification by MPP 200. The list of instructions is executed on the packet data at a later time after classification is complete, rather than modifying the packet data in parallel with MPP 200 examining and classifying the packet data. Thus, MPP 200 typically reads just the packet header, rather than the entire packet, to classify the packet. When the packet modification instructions are later executed, PQM 208 fetches and modifies only the portions of the packet data that are required. This reduces the data bandwidth needed to classify packets and increases the data throughput of MPP 200. PQM 208 also supports multiple independently ordered output flows in parallel to alleviate head of line blocking.

As described in related U.S. patent application Ser. No. 12/974,477 filed on Dec. 21, 2010, in some embodiments, SCH 204 might maintain ordering of operations of PQM 208 by employing a Classification Completion List (CCL). The CCL stores pointers to the contexts and control data, such as context start order, context number, and thread identifiers (THID), for each context. When a new terminating function is issued by PQM 208 to SCH 204, the terminating function is appended to the CCL after any older CCL entries for the corresponding context. The next newest context, for example the next context in the CCL linked list, is then started. When a context becomes the oldest context in MPP 200, SCH 204 reads the CCL contents and sends them to PQM 208 to form instructions to communication interface 202 to generate a corresponding output task that is, for example, based on a vflow ID, a vflow Index, and the actual packet data. SCH 204 might determine which context is the oldest if the context is the head entry of the CCL linked list. Alternatively, if SCH 204 employs more than one output queue (OQ), a CCL linked list might exist for each output queue, and, thus, SCH 204 might select the oldest context from one of the output queues, and sends that context to PQM 208. Since an ordering requirement between OQs is not necessary, any non-empty OQ might be selected (for example, using a round robin algorithm) to begin transmission. The CCL location is freed for another context when the output task is sent to the next destination module of network processor 100.

The CCL is a linked list where newly received packets were added to the end of the CCL such that the first entry in the CCL was the oldest active packet. Thus, the CCL effectively was an ordered, linked list of instruction list pointers of PQM 208. However, a single input packet might correspond to multiple output packets (e.g., multicast packets), each output packet having associated PQM contexts in the CCL. Thus, in embodiments where the CCL is globally ordered, each output packet associated with an input packet would need to be processed before processing of a next input packet could start. Thus, if an input packet corresponded to a large number of output packets, or required extensive classification processing, head-of-line blocking could occur until classification of the first packet classification was completed, and all of its associated output packets are transmitted.

In order to support multiple flows in parallel, some embodiments might employ multiple CCLs (e.g., one CCL for each flow). However, since the CCL is based on a number of contexts of MPP 200 and given that a context might be associated with different flow IDs at different times, the size of the CCL logic might increase as the number of flows supported by MPP 200 increases. Another option could be for the CCL to include the flow identifiers corresponding to each context.

Alternatively, some embodiments might employ per-context memory 209. When PQM 208 receives a first function call for a packet, PQM 208 allocates an instruction list and sends an update message to SCH 204 that includes the context number of the packet and the head pointer to the instruction block. SCH 204 saves the head pointer in per-context memory 209 and sets a valid indicator of the head pointer. When SCH 204 determines that a context is the oldest for a particular flow ID value and the head pointer valid indicator is set, then the head pointer value for the context is read into per-flow FIFO memory 229 of SCH 204. SCH 204 employs per-flow FIFOs 229 to define the order in which the instructions for each individual flow are executed by PQM 208. For example, the instructions for each flow might desirably be executed in the same order the corresponding PDUs for the flows were started by SCH 204. SCH 204 provides an indication to PQM 208 when any per-flow FIFO is non-empty. When PQM 208 receives such an indication, PQM 208 selects a FIFO from which to select an instruction to begin output PDU modification processing.

Figure 3:
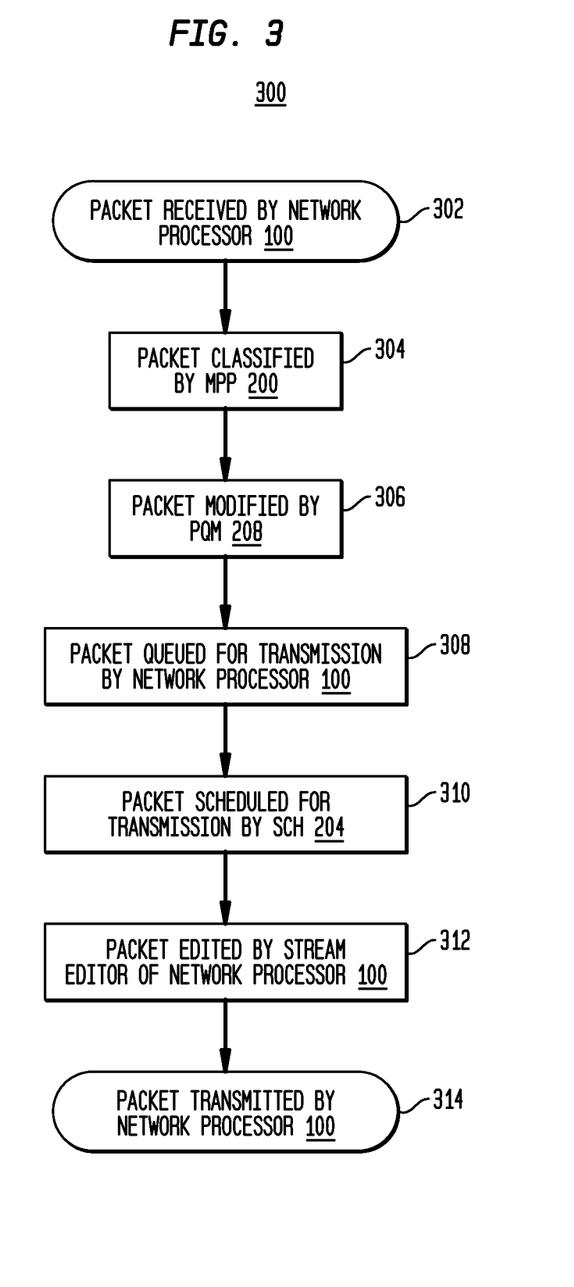
FIG. 3 shows an exemplary flow diagram of packet processing by the packet processor of FIG. 2 in accordance with exemplary embodiments.

FIG. 3 shows an exemplary flow diagram of packet process 300 of MPP 200. As shown in FIG. 3, at step 302, network processor receives a packet, and packet data is written to memory 120. At step 304, the packet is classified by MPP 200 (e.g., by classifier 402 of FIG. 4). At step 306, the packet data is modified by PQM 306, for example, as described regarding FIG. 4 by interacting with SCH 204 and building an instruction list. At step 308, the modified packet is queued for transmission as an output packet of the network processor. At step 310, the modified packet is scheduled by SCH 204 for transmission as an output packet of network processor 100. At step 312, the scheduled packet might optionally be modified by a stream editor of network processor 100 before the packet is transmitted. At step 314, the packet is transmitted as an output packet of network processor 100, and process 300 completes.

Figure 4:
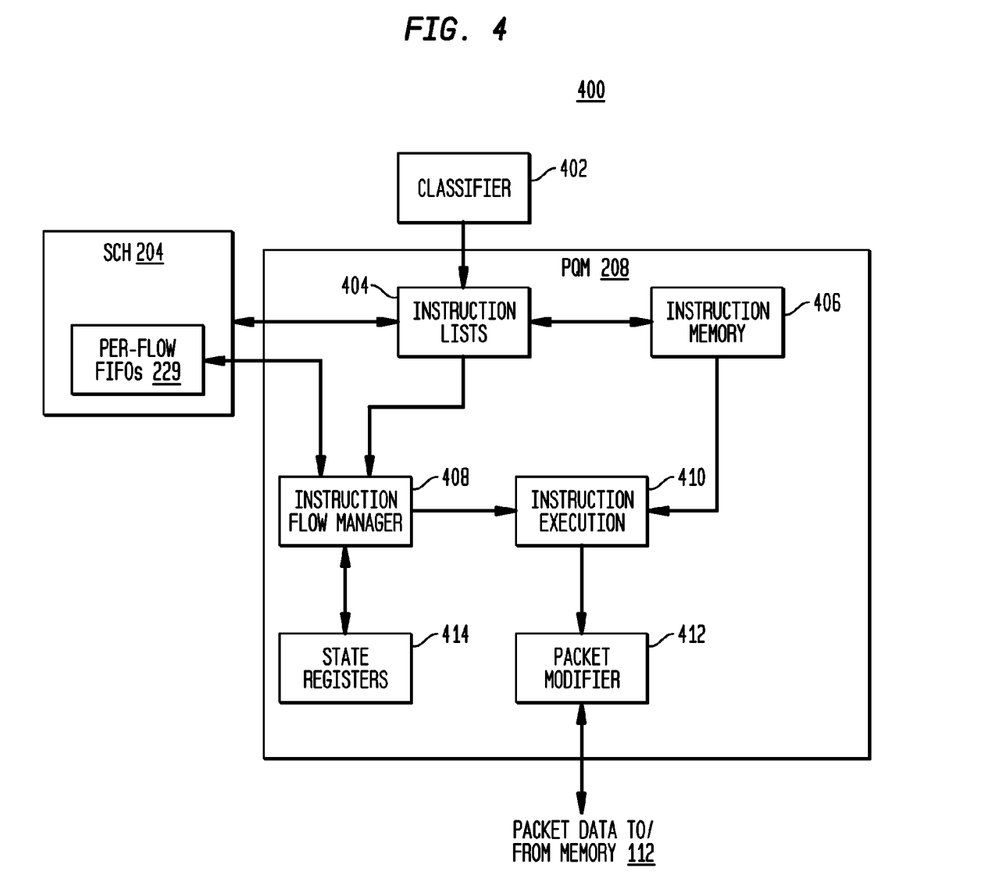
FIG. 4 shows a block diagram of a pre-queue modifier (PQM) of the packet processor of FIG. 2 in accordance with exemplary embodiments.

FIG. 4 shows additional detail of PQM 208. As shown in FIG. 4, PQM 208 includes per-flow state registers 414 to process instructions associated with each flow. Per-flow state registers 414 are each initialized to point to the first instruction in a corresponding instruction list stored in instruction list memory 404. Each instruction list is built by PQM 208 from instructions selected from instruction memory 406, each selected instruction corresponding to a flow context selected from per-flow FIFOs 229. As the PQM completes building an instruction list stored in 404, PQM 208 updates the per-flow state registers 414 and instruction execution module 410 begins processing any completed instruction list stored in 404. Packet modifier 412 modifies packet data retrieved from memory 112 based on executed instructions. Modified packet data is written back to memory 112. Packet data written to memory 112 might be processed or modified by other processing modules of network processor 100 (e.g., the stream editor) before network processor 100 sends the packet data as an output packet. PQM 208 might interleave modified packet data corresponding to any of the independent flows, meaning that if one flow is generating multiple output PDUs from a single input PDU, PQM 208 does not wait until all the output PDUs from a flow are processed before processing an output PDU from any other flow. In this manner progress can be made on multiple flows in parallel mitigating head-of-line blocking issues in PQM 208.

Thus, as described herein, described embodiments classify packets received by a network processor. A processing module of the network processor generates tasks corresponding to each received packet. A scheduler generates contexts corresponding to tasks received by the packet classification processor from corresponding processing modules, each context corresponding to a given flow, and stores each context in a corresponding per-flow first-in, first-out buffer of the scheduler. A packet modifier generates a modified packet based on threads of instructions, each thread of instructions corresponding to a context received from the scheduler. The modified packet is generated before queuing the packet for transmission as an output packet of the network processor, and the packet modifier processes instructions for generating the modified packet in the order in which the contexts were generated for each flow, without head-of-line blocking between flows. The modified packets are queued for transmission as an output packet of the network processor.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments have been described with respect to processing blocks in a software program, including possible implementation as a digital signal processor, micro-controller, or general-purpose computer, described embodiments are not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in non-transitory tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing described embodiments. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the described embodiments. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of the described embodiments.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. Unless explicitly stated otherwise, each numerical value and range should be interpreted as being approximate as if the word "about" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of the described embodiments might be made by those skilled in the art without departing from the scope expressed in the following claims.

We claim:

1. A packet classification processor for a network processor having a plurality of processing modules and at least one shared memory, wherein the network processor generates one or more tasks corresponding to each of a plurality of received packets, the packet processor comprising:
   a scheduler configured to generate one or more contexts corresponding to tasks received by the packet classification processor from corresponding ones of the plurality of processing modules, each context corresponding to a given flow, wherein each context is stored in a corresponding per-flow first-in, first-out buffer;
   a packet modifier configured to generate a modified packet based on one or more threads of instructions, each thread of instructions corresponding to a context received from the scheduler, wherein the modified packet is generated before the packet is queued for transmission as an output packet of the network processor, wherein the packet modifier is configured to process instructions for generating the modified packet in the order in which the contexts were generated for each flow, without head-of-line blocking between flows;
   the network processor is configured to (i) queue the modified packet in an associated output queue, (ii) schedule a queued packet for transmission as an output packet of the network processor, and (iii) transmit the scheduled packet as an output packet.

2. The packet classification processor of claim 1, further comprising:
   a classifier configured to classify a traffic type of each received packet.

3. The packet classification processor of claim 1, wherein the packet modifier comprises:
   one or more per-flow state registers configured to maintain state data for each flow, wherein the per-flow state registers point to a first instruction in a corresponding instruction list of the flow;
   an instruction manager configured to generate one or more instruction lists, each instruction list comprising a list of instructions for the packet modifier to process to generate a modified packet corresponding to the flow associated with the instruction list, the one or more instructions in each instruction list corresponding to instructions stored in an instruction memory of the packet modifier;
   an instruction execution module configured to process completed instruction lists;
   a packet modifying engine configured to (i) read packet data from the at least one shared memory, (ii) modify the read packet data based on the corresponding instructions executed by the instruction execution module, and (iii) write the modified packet data to the at least one shared memory.

4. The packet classification module of claim 1, wherein the modified packet data is processed by one or more of the plurality of processing modules of the network processor before the packet is transmitted as an output packet.

5. The packet classification module of claim 1, wherein the packet modifier is configured to interleave modified packet data corresponding to any of the independent flows, thereby processing multiple flows in parallel and reducing head-of-line blocking.

6. The packet classification module of claim 1, further comprising:
   a thread status manager configured to maintain:
      (i) a thread status table having N status entries, configured to track up to N active threads, where N is a positive integer, and wherein each status entry corresponds to an active thread, and each status entry comprises a valid status indicator, a sequence value, a thread indicator value, and a flow indicator value, and
      (ii) a sequence counter configured to generate a sequence value for each thread of each flow, wherein the sequence counter is incremented each time processing of a thread for a flow is started by the multi-thread instruction engine, and the sequence counter is decremented each time a thread for a flow is completed by the multi-thread instruction engine, whereby a lower relative sequence value indicates an earlier started thread for each flow,
   wherein the thread indicator value of an oldest thread of each flow of the thread status table has a corresponding sequence value equal to 0 for each flow.

7. A method of classifying packets received by a network processor having a plurality of processing modules and at least one shared system memory, the method comprising:
   generating, by at least one of the plurality of processing modules, one or more tasks corresponding to each of a plurality of received packets;
   generating, by a scheduler, one or more contexts corresponding to tasks received by the packet classification processor from corresponding ones of the plurality of processing modules, each context corresponding to a given flow, and storing each context in a corresponding per-flow first-in, first-out buffer of the scheduler;
   generating, by a packet modifier, a modified packet based on one or more threads of instructions, each thread of instructions corresponding to a context received from the scheduler, wherein the modified packet is generated before queuing the packet for transmission as an output packet of the network processor, wherein the packet modifier processes instructions for generating the modified packet in the order in which the contexts were generated for each flow, without head-of-line blocking between flows;
   queuing the modified packet in an associated output queue;
   scheduling a queued packet for transmission as an output packet of the network processor; and
   transmitting the scheduled packet as an output packet.

8. The method of claim 7, further comprising:
classifying, by a classifier of the packet classification module, a traffic type of each received packet.

9. The method of claim 7, further comprising:
maintaining, by one or more per-flow state registers of the packet modifier, state data for each flow, wherein the per-flow state registers point to a first instruction in a corresponding instruction list of the flow;
generating, by an instruction manager of the packet modifier, one or more instruction lists, each instruction list comprising a list of instructions for the packet modifier to process to generate a modified packet corresponding to the flow associated with the instruction list, the one or more instructions in each instruction list corresponding to instructions stored in an instruction memory of the packet modifier;
processing, by an instruction execution module of the packet modifier, completed instruction lists;
by a packet modifying engine of the packet modifier:
   reading packet data from the at least one shared memory;
   modifying the read packet data based on the corresponding instructions executed by the instruction execution module; and
   writing the modified packet data to the at least one shared memory.

10. The method of claim 7, further comprising:
processing the modified packet data by one or more of the plurality of processing modules of the network processor before transmitting the packet as an output packet of the network processor.

11. The method of claim 7, further comprising:
interleaving, by the packet modifier, modified packet data corresponding to any of the independent flows, thereby processing multiple flows in parallel and reducing head-of-line blocking.

12. The method of claim 7, further comprising the steps of:
   allocating, by the scheduler, a corresponding one of the one or more threads for each flow to the multi-thread instruction engine for processing; and
   deallocating, by the scheduler, a corresponding one of the one or more threads for each flow from the multi-thread instruction engine upon the multi-thread instruction engine completing the corresponding thread.

13. The method of claim 7, further comprising:
   maintaining, by a thread status manager, (i) a thread status table having N status entries, where N is a positive integer, and (ii) a sequence counter for each flow;
   tracking, by the thread status table, up to N active threads, wherein each status entry corresponds to an active thread, and each status entry comprises a valid status indicator, a sequence value, a thread indicator value, and a flow indicator value,
   generating, by each sequence counter, a sequence value for each thread by the steps of:
      incrementing the sequence counter each time processing of a thread for the associated flow is started by the multi-thread instruction engine, and
      decrementing the sequence counter each time a thread for the associated flow is completed by the multi-thread instruction engine, whereby a lower relative sequence value indicates an earlier started thread for the flow; and
   providing, by the thread status manager to the scheduler, the oldest thread for each flow of the thread status table, wherein the oldest thread has a corresponding sequence value equal to 0 for each flow.

14. A non-transitory machine-readable medium, having encoded thereon program code, wherein, when the program code is executed by a machine, the machine implements a method of classifying packets received by a network processor having a plurality of processing modules and at least one shared system memory, the method comprising:
- generating, by at least one of the plurality of processing modules, one or more tasks corresponding to each of a plurality of received packets;
- generating, by a scheduler, one or more contexts corresponding to tasks received by the packet classification processor from corresponding ones of the plurality of processing modules, each context corresponding to a given flow, and storing each context in a corresponding per-flow first-in, first-out buffer of the scheduler;
- generating, by a packet modifier, a modified packet based on one or more threads of instructions, each thread of instructions corresponding to a context received from the scheduler, wherein the modified packet is generated before queuing the packet for transmission as an output packet of the network processor, wherein the packet modifier processes instructions for generating the modified packet in the order in which the contexts were generated for each flow, without head-of-line blocking between flows;
- queuing the modified packet in an associated output queue;
- scheduling a queued packet for transmission as an output packet of the network processor; and
- transmitting the scheduled packet as an output packet.

15. The non-transitory machine-readable medium of claim 14, further comprising:
- classifying, by a classifier of the packet classification module, a traffic type of each received packet.

16. The non-transitory machine-readable medium of claim 14, further comprising:
- maintaining, by one or more per-flow state registers of the packet modifier, state data for each flow, wherein the per-flow state registers point to a first instruction in a corresponding instruction list of the flow;
- generating, by an instruction manager of the packet modifier, one or more instruction lists, each instruction list comprising a list of instructions for the packet modifier to process to generate a modified packet corresponding to the flow associated with the instruction list, the one or more instructions in each instruction list corresponding to instructions stored in an instruction memory of the packet modifier;
- processing, by an instruction execution module of the packet modifier, completed instruction lists;
- by a packet modifying engine of the packet modifier:
  - reading packet data from the at least one shared memory;
  - modifying the read packet data based on the corresponding instructions executed by the instruction execution module; and
  - writing the modified packet data to the at least one shared memory.

17. The non-transitory machine-readable medium of claim 14, further comprising:
- processing the modified packet data by one or more of the plurality of processing modules of the network processor before transmitting the packet as an output packet of the network processor.

18. The non-transitory machine-readable medium of claim 14, further comprising:
- interleaving, by the packet modifier, modified packet data corresponding to any of the independent flows, thereby processing multiple flows in parallel and reducing head-of-line blocking.

19. The non-transitory machine-readable medium of claim 14, further comprising the steps of:
- allocating, by the scheduler, a corresponding one of the one or more threads for each flow to the multi-thread instruction engine for processing; and
- deallocating, by the scheduler, a corresponding one of the one or more threads for each flow from the multi-thread instruction engine upon the multi-thread instruction engine completing the corresponding thread.

20. The non-transitory machine-readable medium of claim 14, further comprising:
- maintaining, by a thread status manager, (i) a thread status table having N status entries, where N is a positive integer, and (ii) a sequence counter for each flow;
- tracking, by the thread status table, up to N active threads, wherein each status entry corresponds to an active thread, and each status entry comprises a valid status indicator, a sequence value, a thread indicator value, and a flow indicator value,
- generating, by each sequence counter, a sequence value for each thread by the steps of:
  - incrementing the sequence counter each time processing of a thread for the associated flow is started by the multi-thread instruction engine, and
  - decrementing the sequence counter each time a thread for the associated flow is completed by the multi-thread instruction engine, whereby a lower relative sequence value indicates an earlier started thread for the flow; and
- providing, by the thread status manager to the scheduler, the oldest thread for each flow of the thread status table, wherein the oldest thread has a corresponding sequence value equal to 0 for each flow.

\* \* \* \* \*